(12) United States Patent
Manabe et al.

(10) Patent No.: US 9,975,108 B2
(45) Date of Patent: May 22, 2018

(54) ADSORBENT FOR ADSORPTION HEAT PUMPS, PRODUCTION METHOD THEREOF, AND ADSORPTION HEAT PUMP

(71) Applicant: FUJITSU LIMITED, Kawasaki-shi, Kanagawa (JP)

(72) Inventors: Toshio Manabe, Atsugi (JP); Hiroaki Yoshida, Isehara (JP); Noriyasu Aso, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 14/926,543

(22) Filed: Oct. 29, 2015

(65) Prior Publication Data

US 2016/0045892 A1    Feb. 18, 2016

Related U.S. Application Data

(63) Continuation of application No. PCT/JP2013/064142, filed on May 22, 2013.

(51) Int. Cl.
| | |
|---|---|
| *C01B 31/08* | (2006.01) |
| *B01J 20/22* | (2006.01) |
| *B01J 20/20* | (2006.01) |
| *B01J 20/28* | (2006.01) |
| *B01J 20/32* | (2006.01) |
| *B01J 20/30* | (2006.01) |
| *F25B 17/08* | (2006.01) |
| *C01B 32/30* | (2017.01) |
| *F25B 30/04* | (2006.01) |

(52) U.S. Cl.
CPC .............. *B01J 20/22* (2013.01); *B01J 20/20* (2013.01); *B01J 20/28066* (2013.01); *B01J 20/3078* (2013.01); *B01J 20/3204* (2013.01); *B01J 20/3251* (2013.01); *B01J 20/3287* (2013.01); *C01B 32/30* (2017.08); *F25B 17/083* (2013.01); *F25B 30/04* (2013.01); *Y02P 20/129* (2015.11)

(58) Field of Classification Search
CPC .................................. B01J 20/22; C01B 32/30
See application file for complete search history.

(56) References Cited

U.S. PATENT DOCUMENTS

| 4,045,353 | A | * | 8/1977 | Kosaka | .................. | B01J 20/286 |
| | | | | | | 210/198.2 |
| 4,248,736 | A | * | 2/1981 | Fuchigami | .......... | A61M 1/3679 |
| | | | | | | 210/646 |
| 5,063,196 | A | * | 11/1991 | Doughty | ................... | B01J 20/20 |
| | | | | | | 423/236 |
| 5,658,372 | A | * | 8/1997 | Gadkaree | ............... | B01D 53/02 |
| | | | | | | 95/116 |
| 6,589,904 | B1 | * | 7/2003 | Iwasaki | .................... | C01B 31/08 |
| | | | | | | 210/348 |
| 8,496,734 | B2 | * | 7/2013 | Gadkaree | ............... | B01D 53/02 |
| | | | | | | 502/400 |
| 2004/0089001 | A1 | * | 5/2004 | Kakiuchi | ............. | B01J 20/0292 |
| | | | | | | 62/112 |
| 2011/0315922 | A1 | | 12/2011 | Elsayed et al. | | |

FOREIGN PATENT DOCUMENTS

| CN | 1626455 | 6/2005 |
|---|---|---|
| CN | 102216213 | 10/2011 |
| JP | 4-346814 A | 12/1992 |
| JP | 6-074596 A | 3/1994 |
| JP | 9-239267 A | 9/1997 |
| JP | 10-263394 A | 10/1998 |
| JP | 11-063721 A | 3/1999 |
| JP | 2002-235965 A | 8/2002 |
| JP | 2002-255531 A | 9/2002 |
| JP | 2004-223385 A | 8/2004 |
| JP | 2005-288224 A | 10/2005 |
| JP | 2005-289690 A | 10/2005 |

OTHER PUBLICATIONS

CNOA—Notification of the First Office Action dated Sep. 5, 2016 for Chinese Patent Application No. 201380076751.5, with English translation.

International Search Report and Written Opinion of the International Searching Authority (Form PCT/ISA/210, Form PCT/ISA/237), mailed in connection with PCT/JP2013/064142 and dated Aug. 20, 2013 (8 pages).

* cited by examiner

*Primary Examiner* — Stuart Hendrickson
(74) *Attorney, Agent, or Firm* — Fujitsu Patent Center

(57) ABSTRACT

An adsorbent for adsorption heat pumps, containing: activated carbon; and organic molecules each containing at least one hydrophilic functional group, where the organic molecules are provided in pores of the activated carbon.

3 Claims, 6 Drawing Sheets

ADSORBENT FOR ADSORPTION HEAT PUMPS, PRODUCTION METHOD THEREOF, AND ADSORPTION HEAT PUMP

CROSS-REFERENCE TO RELATED APPLICATION

This application is a continuation application of International Application PCT/JP2013/064142 filed on May 22, 2013 and designated the U.S., the entire contents of which are incorporated herein by reference.

FIELD

The embodiment discussed herein relates to an adsorbent for adsorption heat pumps, a production method thereof, and an adsorption heat pomp.

BACKGROUND

Recently, an importance of developments of technologies for preventing global warming, and reducing environmental loads, such as conservation of energy resources, has rapidly increased. With such trends, attentions have been attracted to technologies for recovering and recycling waste heat, which has been regarded as useless and discarded in the conventional art. One of the technologies is an adsorption heat pump.

The adsorption heat pump is a technology for converting low quality thermal energy of 100° C. or lower into usable cooling heat by using transfer of latent heat generated when an adsorbate, such as water, and methanol, is adsorbed or desorbed on an adsorbent, such as silica gel, and activated carbon.

Many researches have been conducted on the adsorption heat pump since 1978, as energy can be recovered from various types of low temperature waste heat, because heating heat required for desorption can be relative low temperature, such as about 60° C., depending on a type of an adsorbent.

In order to achieve an adsorption heat pump having a high energy recovery efficiency, required is an adsorbent, which causes desorption with lower waste heat temperature (50° C. to 60° C.), and causes adsorption with higher cooling water temperature (25° C. to 30° C.), which means that an adsorption and desorption reaction is carried out in the relative vapor pressure range of 0.2 to 0.6 in an adsorption isotherm.

Silica gel and zeolite, which are currently often used as adsorbents for adsorption heat pumps, easily adsorb water at high temperature, because surface thereof are hydrophilic. However, the silica gel and zeolite have a problem that it is difficult to desorb the water. The reason thereof is because an adsorption amount is relative high at the relative vapor pressure of less than 0.2, and a changed amount in the aforementioned range of the relative vapor pressure is small.

As for an adsorbent other than those mentioned above, use of activated carbon has been studies. The activated carbon surface of which is hydrophobic has excellent desorption properties at low temperature, a ad has an adsorption amount of substantially 0 in the low relative vapor pressure range. Moreover, the rising of the adsorption isotherm thereof is sharp, and thus there is an advantage that a large difference in the adsorption amount can be secured. On the other hand, there is a problem that the intended performance cannot be attained with high cooling water temperature, because the adsorption and desorption reaction is carried out at the relative vapor pressure of greater than 0.6, when the activated carbon is used as it is.

According, the activated carbon has been modified for use. Examples of the modification of the activated carbon include a hydrophilic treatment of a surface of the activated carbon. For example, proposed is hydrophilic activated carbon obtained by subjecting activated carbon, which has been generated by treating an organic polymer resin with an activator agent, to an acid treatment, which is a hydrophilic treatment (for example, see Japanese Patent Application Laid-Open (JP-A) No. 2005-288224). The acid treatment is carried out by dipping the activated carbon in nitric acid or a hydrogen peroxide aqueous solution.

However, the acid treatment has a problem that the hydrophilic treatment cannot be controlled and it is difficult to obtain an adsorbent having a desired adsorption isotherm, as the acid treatment is merely to dip the activated carbon in an acidic reagent. Even when an adsorbent having a desired adsorption isotherm is obtained, heat resistance of the adsorbent is not sufficient, and the adsorption isotherm is changed by heat. Therefore, the acid treatment cannot provide an adsorbent for adsorption heat pumps having a high energy recovery efficiency and excellent heat resistance.

Accordingly, there are currently needs for an adsorbent for adsorption heat pumps, which has a high energy recovery efficiency, and excellent heat resistance, a production method thereof, and an adsorption heat pump, which has a high energy recovery efficiency.

SUMMARY

The disclosed adsorbent for adsorption heat pumps contains: activated carbon; and organic molecules each containing at least one hydrophilic functional group, where the organic molecules are provided in pores of the activated carbon.

The disclosed production method of an adsorbent for adsorption heat pumps is a method for producing the disclosed adsorbent for adsorption heat pumps, and the disclosed production method contains dipping the activated carbon in a liquid containing the organic molecules.

The disclosed adsorption heat pump contains the disclosed adsorbent for adsorption heat pumps The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Figure 1:
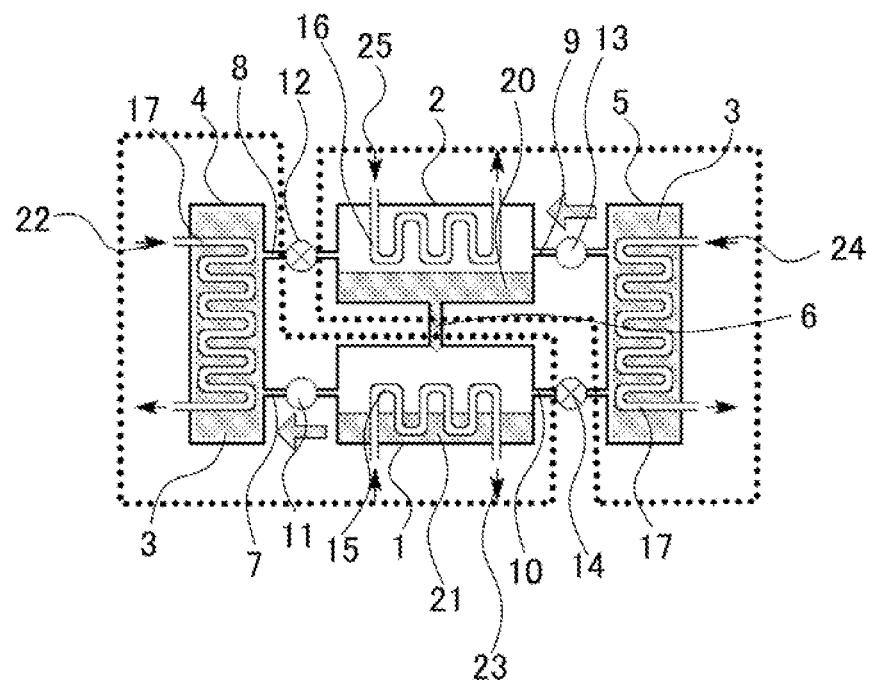
FIG. 1 is a schematic diagram illustrating one example of an adsorption heat pump.
Figure 2:
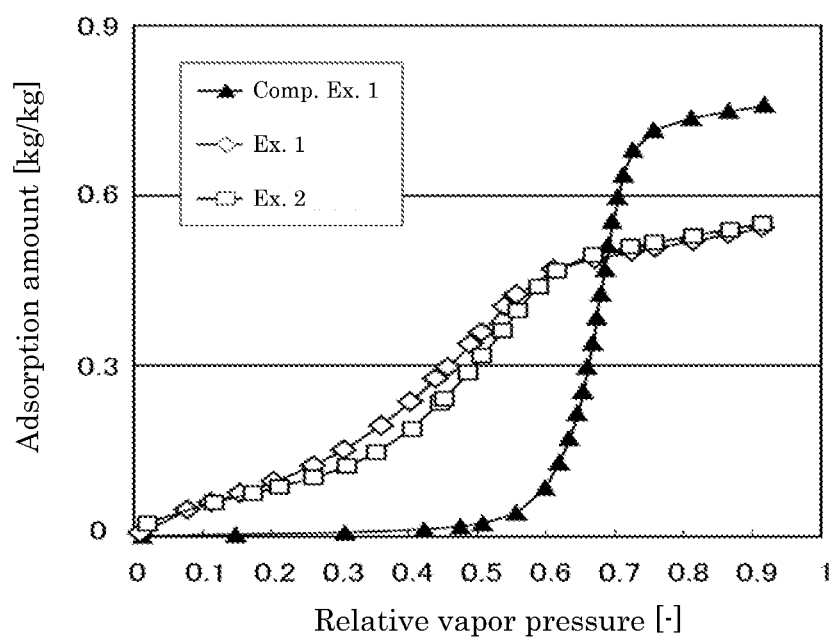
FIG. 2 is water vapor adsorption isotherms of the adsorbents for adsorption heat pumps of Example 1, Example 2, and Comparative Example 1.
Figure 3:
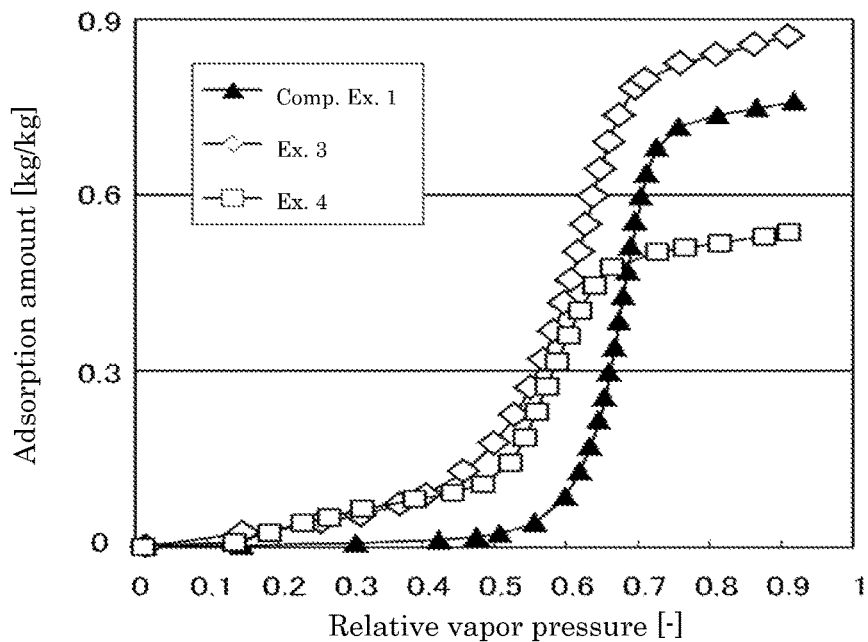
FIG. 3 is water vapor adsorption isotherms of the adsorbents for adsorption heat pumps of Example 3, Example 4, and Comparative Example 1.
Figure 4:
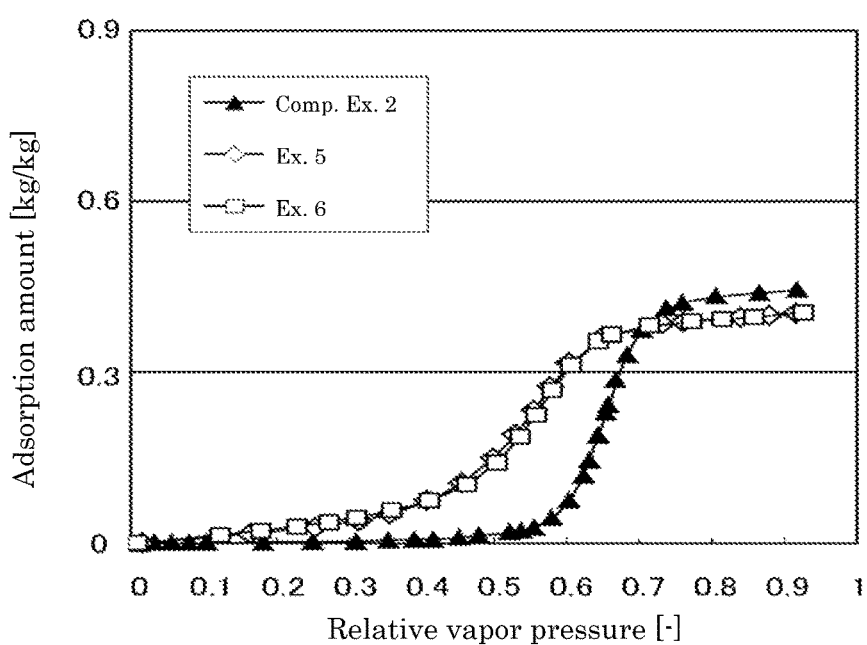
FIG. 4 is water vapor adsorption isotherms of the adsorbents for adsorption heat pumps of Example 5, Example 6, and Comparative Example 2.

DESCRIPTION OF EMBODIMENTS (Adsorbent for Adsorption Heat Pumps)

The disclosed adsorbent for adsorption heat pumps contains activated carbon, and organic molecules each containing at least one hydrophilic functional group, where the organic molecules are provided in pores of the activated carbon.

Hydrophilic properties inside pores can be enhanced by providing the organic molecules each containing a hydrophilic functional group inside the pores of the activated carbon, unlike a hydrophilic treatment of the activated carbon. Moreover, an amount of hydrophilic functional groups and a type of the hydrophilic functional group can be strictly controlled by introducing the hydrophilic functional groups into the pores in the state of molecules <Activated Carbon>

The activated carbon is appropriately selected depending on the intended purpose without any limitation.

A specific surface area of the activated carbon is appropriately selected depending on the intended purpose without any limitation, but the specific surface area thereof is preferably 1,000 $m^2/g$ to 2,500 $m^2/g$, more preferably 1,200 $m^2/g$ to 2,000 $m^2/g$. When the specific surface area is within the aforementioned more preferable range, it is advantageous because a high performance adsorbent for adsorption heat pumps, with which an adsorption and desorption reaction is carried out in a relative vapor pressure range of 0.2 to 0.6 in an adsorption isotherm, is obtained.

For example, the specific surface area can be determined by measuring a nitrogen adsorption isotherm by means of a specific surface area and pore size distribution measurement device (BELSORP-mini, manufactured by BEL JAPAN, INC.), and analyzing by the BET method.

The activated carbon for use may be produced, or selected from commercial products. Examples of the commercial products of the activated carbon include spherical activated carbon TAIKO Q-Type (manufactured by Futamura Chemical Co., Ltd.), and KUREHA spherical activated carbon BAC (manufactured by KUREHA CORPORATION).

<Organic Molecules>

The organic molecules each contain at least one hydrophilic functional group.

In the adsorbent for adsorption heat pumps, the organic molecules are present inside pores of the activated carbon.

A molecular weight of the organic molecule is appropriately selected depending on the intended purpose without any limitation, but the molecular weight thereof is preferably 50 to 300, more preferably 60 to 280, and particularly preferably 90 to 270. When the molecular weight of the organic molecule is less than 50, the organic molecule tends to move out from a pore of the activated carbon, hence a hydrophilic nature of the adsorbent for adsorption heat pumps may be lowered. When the molecular weight of the organic molecule is greater than 300, an adsorption ability of the adsorbent for adsorption heat pumps may be low. When the molecular weight of the organic molecule is within the aforementioned particularly preferable range, it is advantageous because hydrophilic properties of a resulting adsorbent for adsorption heat pumps become appropriate, and a high performance adsorbent for adsorption heat pumps, with which an adsorption and desorption reaction is carried out in a relative vapor pressure range of 0.2 to 0.6 in an adsorption isotherm, is obtained.

The number of carbon atoms in the organic molecule excluding the number of carbon atoms of the hydrophilic functional group is appropriately selected depending on the intended purpose without any limitation, but the number thereof is preferably 1 to 10, more preferably 1 to 6. When the number of carbon atoms in the organic molecule excluding the number of carbon atoms of the hydrophilic functional group is greater than 10, an adsorption ability of the adsorbent for adsorption heat pumps may be low. When the number of carbon atoms in the organic molecule excluding the number of carbon atoms of the hydrophilic functional group is within the aforementioned more preferable range, it is advantageous because hydrophilic properties of a resulting adsorbent for adsorption heat pumps become appropriate, and a high performance adsorbent for adsorption heat pumps, with which an adsorption and desorption reaction is carried out in a relative vapor pressure range of 0.2 to 0.6 in an adsorption isotherm, is obtained.

The hydrophilic functional group is a functional group having a polarity. For example, the hydrophilic functional group is a functional group capable of forming a hydrogen bond with another functional group. Examples of the hydrophilic functional group include a hydroxyl group, a carbonyl group, a carboxyl group, and a sulfo group.

The at least one hydrophilic functional group in the organic molecule is appropriately selected depending on the intended purpose without any limitation, but the at least one hydrophilic functional group is preferably at least one selected from the group consisting of a hydroxyl group, a carbonyl group, a carboxyl group, and a sulfo group. Use of any of the foregoing groups as the hydrophilic functional group is advantageous because hydrophilic properties of a resulting adsorbent for adsorption heat pumps become appropriate, and a high performance adsorbent for adsorption heat pumps, with which an adsorption and desorption reaction is carried out in a relative vapor pressure range of 0.2 to 0.6 in an adsorption isotherm, is obtained.

The number of the hydrophilic functional groups in the organic molecule is appropriately selected depending on the intended purpose without any limitation, but the number thereof is preferably 1 to 4. Use of the aforementioned number of the hydrophilic functional groups is advantageous because hydrophilic properties of a resulting adsorbent for adsorption heat pumps become appropriate, and a high performance adsorbent for adsorption heat pumps, with which an adsorption and desorption reaction is carried out in a relative vapor pressure range of 0.2 to 0.6 in an adsorption isotherm, is obtained.

The organic molecule is preferably at least one selected from the group consisting of maleic acid (molecular weight: 116), methanesulfonic acid (molecular weight: 96), squaric acid (molecular weight: 114), sulfoisophthalic acid (molecular weight: 246), and benzene tetracarboxylic acid (molecular weight: 254).

Examples of the sulfoisophthalic acid include 5-sulfoisophthalic acid.

Examples of the benzene tetracarboxylic acid include pyromellitic acid.

The maleic acid, the methanesulfonic acid, the squaric acid, the 5-sulfoisophthalic acid, and the pyromellitic acid are represented by the following structural formulae, respectively.

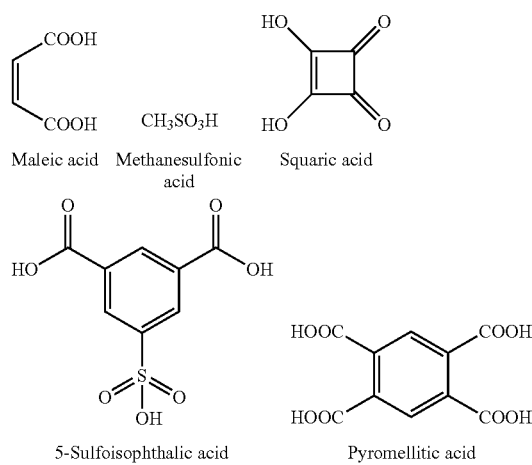

A method for producing the adsorbent for adsorption heat pumps is appropriately selected depending on the intended purpose without any limitation, but the method thereof is preferably the production method of an adsorbent for adsorption heat pumps, which is described hereinafter.

The disclosed adsorbent for adsorption heat pumps can solve the aforementioned various problems in the art, and can provide an adsorbent for adsorption heat pumps, which has a high energy recovery efficiency, and excellent heat resistance.

(Production Method of Adsorbent for Adsorption Heat Pumps)

The disclosed production method of an adsorbent for adsorption heat pumps contains at least a dipping step, preferably further contains a heating step, and may further contain other steps, if necessary.

The production method of an adsorbent for adsorption heat pumps is a method for producing the disclosed adsorbent for adsorption heat pumps.

<Dipping Step>

The dipping step is appropriately selected depending on the intended purpose without any limitation, provided that the dipping step is a step containing dipping the activated carbon in a liquid containing the organic molecules.

An amount of the activated carbon relative to the liquid at the time of the dipping is appropriately selected depending on the intended purpose without any limitation.

A duration of the dipping is appropriately selected depending on the intended purpose without any limitation, but the duration thereof is preferably 1 hour to 48 hours, more preferably 2 hours to 24 hours, and particularly preferably 6 hours to 18 hours.

Temperature of the liquid at the time of the dipping is appropriately selected depending on the intended purpose without any limitation, but the temperature thereof is preferably 10° C. to 50° C., more preferably 20° C. to 40° C.

The liquid is appropriately selected depending on the intended purpose without any limitation. The liquid may be an organic solvent solution containing the organic molecules, or an aqueous solution containing the organic molecules. In the case where the organic molecules are in the state of a liquid, the liquid may be the organic molecules themselves. Among them, the liquid is preferably an aqueous solution containing the organic molecules because of easy handling.

An amount of the organic molecules in the liquid is appropriately selected depending on the intended purpose without any limitation. The amount thereof is preferably 0.1% by mass to 10% by mass, more preferably 0.5% by mass to 5% by mass, and particularly preferably 1% by mass to 4% by mass, in view of easiness of an adjustment of an introduction amount of the organic molecules in pores of the activated carbon.

Examples of an organic solvent in the organic solvent solution include alcohol, and toluene. Examples of the alcohol include methanol, and ethanol.

<Heating Step>

The heating step is appropriately selected depending on the intended purpose without any limitation, provided that the heating step is a step containing heating the activated carbon after the dipping to obtain the activated carbon containing the organic molecules in pores thereof.

Temperature of the heating of the activated carbon is appropriately selected depending on the intended purpose without any limitation, but the temperature thereof is preferably 100° C. to 250° C., as unnecessary organic molecules can be efficiently removed.

A duration of the heating is appropriately selected depending on the intended purpose without any limitation, but the duration thereof is preferably 0.5 hours to 6 hours, more preferably 1 hour to 3 hours.

The heating of the activated carbon is preferably performed under reduced pressure, as unnecessary organic molecules can be efficiently removed.

The disclosed production method of an adsorbent for adsorption heat pumps can solve the aforementioned various problems in the art, and can produce an adsorbent for adsorption heat pumps, which has a high energy recovery efficiency, and excellent heat resistance.

(Adsorption Heat Pump)

The disclosed adsorption heat pump contains at least the disclosed adsorbent for adsorption heat pumps, and may further contain other members, if necessary.

One example of the disclosed adsorption heat pump is explained with reference to a drawing.

As illustrated in FIG. 1, the disclosed adsorption heat pump contains an evaporator 1 configured to evaporate a liquid adsorbate to turn the liquid adsorbate into a gas adsorbate, a condenser 2, which is configured to condense the gas adsorbate to turn the gas adsorbate into the liquid adsorbate, and two adsorbers 4, 5, each of which contains the adsorbent for adsoption heat pumps 3 capable of adsorb and desorb the adsorbate.

The evaporator 1 and the condenser 2 are connected to each other with a first channel 6. Moreover, one adsorber 4 is connected to one side of the evaporator 1 and the condenser 2 (left side in FIG. 1). Specifically, one side of the evaporator 1 and one adsorber 4 are connected to each other with a second channel 7, and one side of the condenser 2 and one adsorber 4 are connected with each other with a third channel 8. Furthermore, another adsorber 5 is connected to the other side of the evaporator 1 and the condenser 2 (right side in FIG. 1). Specifically, the other side of the condenser 2 and another adsorber 5 are connected to each other with a fourth channel 9, and the other side of the evaporator 1 and another adsorber 5 are connected to each other with a fifth channel 10. Moreover, valves 11 to 14, each configured to close and open a channel, are respectively provided to the second channel 7, the third channel 8, the fourth channel 9, and the fifth channel 10. Note that, the evaporator 1, the condenser 2, the adsorbers 4, 5, and the channels 6 to 10 each have a sealed space inside thereof. When the adsorption heat pump is used, the space is typically in the state of reduced pressure.

The evaporator 1 is configured to phase change the liquid adsorbate 21 into a gas adsorbate. The evaporator 1 contains a heat exchanger configured to extract cooling heat 23, and is equipped with a tubular member 15, in which a liquid capable of transporting cooling heat 23 generated, when the liquid adsorbate 21 is evaporated, to the outside is passed through as a medium for heat transfer. In the evaporator 1, the liquid adsorbate 21 is evaporated by adsorbing the gas adsorbate with one adsorber (the adsorber 4 in FIG. 1) in the process of the adsorption, and passing the gas adsorbate from the evaporator 1 to one adsorber 4 via the channel (the second channel 7 in FIG. 1). The cooling heat 23 generated when the liquid adsorbate 21 is evaporated is transported to outside with a liquid passing through inside the tubular member 15 as a medium for heat transfer, and is used, for example, for cooling.

The condenser 2 is a heat exchanger configured to cooling the gas adsorbate to phase change into a liquid adsorbate 20. The condenser 2 is equipped with a tubular member 16, in which a liquid (cooling water 25 in the drawing) having low temperature than a condensation point of the adsorbate is passed as a medium for heat transfer. The condenser 2 cools the gas adsorbate flown from one adsorber (the adsorber 5 in FIG. 1) via the channel (the fourth channel 9 in FIG. 1) in the process of desorption to phase change the gas adsorbate into a liquid adsorbate 20. Then, the liquid adsorbate 20 is sent from the condenser 2 to the evaporator 1 via the first channel 6. For example, the adsorbate is water. Note that, alcohol, such as methanol, and ethanol, may be used as the adsorbate.

The adsorbers 4, 5 were each a heat exchanger, which is equipped with a tubular member 17 capable of passing a liquid therein, and filled with the adsorbent for adsorption heat pumps 3 around the tubular member 17.

The adsorbent for adsorption heat pumps 3 dominantly causes desorption of the adsorbate at the certain temperature or higher, and dominantly causes adsorption lower than the aforementioned temperature.

Therefore, the temperature of the adsorbent for adsorption heat pumps is controlled with the temperature of the liquid passed through the tubular member 17. The control of the temperature thereof can control desorption or adsorption of the adsorbate.

In the adsorption process where the adsorbate is adsorbed on the adsorbent for adsorption heat pumps 3, which is provided in each of the adsorbers 4, 5, specifically, a liquid that can be controlled to the temperature, at which adsorption of the adsorbate dominantly occurs, is passed through the tubular member 17 as a medium for heat transfer. In this embodiment, cooling water 22 is passed through as a medium for heat transfer to cool the adsorbent for adsorption heat pumps 3, to thereby adsorb the adsorbate onto the adsorbent for adsorption heat pumps 3.

In the desorption process where the adsorbate is desorbed from the adsorbent for adsorption heat pumps 3, which is provided in each of the adsorbers 4, 5, on the other hand, a liquid that can be controlled to the temperature, at which desorption of the adsorbate dominantly occurs, is passed through the tubular member 17 as a medium for heat transfer. In this embodiment, the temperature for causing desorption of the adsorbate from the adsorbent for adsorption heat pumps 3 is about 60° C. Therefore, relatively low temperature waste heat, such as of about 100° C. or lower, is utilized as heating heat. Specifically, the heating heat collected from the waste heat is transferred with a liquid serving as a medium for heat transfer, and the adsorbent for adsorption heat pumps 3 is heated to desorb the adsorbate from the adsorbent for adsorption heat pumps 3.

In the adsorption heat pump constructed in the aforementioned manner, the adsorption process and the desorption process are repeated by switching an opening and closing state of the valves 11 to 14 to continuously generate cooling heat from heating heat.

In the case where the valves 11, 13 are in the opened state, and the valves 12, 14 are in the closed state as illustrated in FIG. 1, for example, one adsorber 4 (left side in FIG. 1) is connected to the evaporator 1, and the other adsorber 5 (right side in FIG. 1) is connected to the condenser 2. In this case, cooling water 22 is passed through in one adsorber 4 to cool the adsorbent for adsorption heat pumps 3, and heating heat 24 collected from waste heat is transferred to the other adsorber 5 with a liquid, to heat the adsorbent for adsorption heat pumps 3. As a result, the adsorbate is adsorbed on the adsorbent for adsorption heat pumps 3, which is provided in one adsorber 4, and the adsorbate is desorbed from the adsorbent for adsorption heat pumps 3, which is provided in the other adsorber 5. In other words, one adsorber 4 connected to the evaporator 1 is in the state of the adsorption process, and the other adsorber 5 connected to the condenser 2 is in the state of the desorption process.

In the case where the valves 12, 14 are in the opened state, and the valves 11, 13 are in the closed state, on the other hand, the other adsorber 5 (right side in FIG. 1) is connected to the evaporator 1, and one adsorber 4 (left side in FIG. 1) is connected to the condenser 2. In this case, cooling water 22 is passed through in the other adsorber 5 to cool the adsorbent for adsorption heat pumps 3, and heating heat collected from waste heat is transferred to one adsorber 4 with a liquid, to heat the adsorbent for adsorption heat pumps 3. As a result, the adsorbate is adsorbed on the adsorbent for adsorption heat pumps 3, which is provided in the other adsorber 5, and the adsorbate is desorbed from the adsorbent for adsorption heat pumps 3, which is provided in one adsorber 4. In other words, the other adsorber 5 connected to the evaporator 1 is in the state of the adsorption process, and one adsorber 4 connected to the condenser 2 is in the state of the desorption process.

As described above, cooling heat can be continuously generated from heating heat by repeating the adsorption process and the desorption process through switching of the opening and closing state of the valves 11 to 14.

Note that, in the embodiment above, the adsorption process of one adsorber 4 and the desorption process of the other adsorber 5 are performed at the same time, and the desorption process of one adsorber 4 and the adsorption process of the other adsorber 5 are performed at the same time, and the adsorption process and the desorption process are repeatedly performed. However, the embodiment thereof is not limited thereto. For example, the adsorption process of one adsorber 4 and the adsorption process of the other adsorber 5 may be performed at the same time, the desorption process of one adsorber 4 and the desorption process of the other adsorber 5 may be performed at the same time, and the adsorption process and the desorption process may be repeatedly performed. Specifically, the adsorption process and the desorption process may be performed in stages. In this case, the valves 11, 14 are in the opened state and the valves 12, 13 are in the closed state in the adsorption process, so that cooling water is passed through in both the adsorbers 4, 5 to cool the adsorbent for adsorption heat pumps 3. In the desorption process, on the other hand, the valves 12, 13 are in the opened state, and the valves 11, 14 are in the closed state so that heating heat collected from waste heat is transported to the both adsorbers 4, 5 with a liquid to heat the adsorbent for adsorption heat pumps 3.

The disclosed adsorption heat pump can solve the aforementioned various problems in the art, and can provide an adsorption heat pump, which has a high energy recovery efficiency.

EXAMPLES

The disclosed adsorbent for adsorption heat pumps and production method thereof are more specifically explained through examples hereinafter, but the disclosed adsorbent and production method thereof are not limited to these examples.

In the following examples, a specific surface area and water vapor adsorption isotherm were measured by the following methods.

<Specific Surface Area>

A specific surface area was determined by measuring nitrogen adsorption isotherm by means of a specific surface area and pore size distribution measurement device (BEL-SORP-mini manufactured by BEL JAPAN, INC.), and analyzing with the BET method. A measuring sample was pre-treated by heating for 3 hours in vacuum at 150° C.

<Water Vapor Adsorption Isotherm>

Water vapor adsorption isotherm was determined by means of an adsorption isotherm measurement device (BEL-SORP-aqua3, manufactured by BEL JAPAN, INC.) under the conditions that the temperature of an air thermostat was 80° C., the adsorption temperature was 30° C., the saturated vapor pressure was 4.245 kPa, and the equilibrium time was 500 seconds. A measuring sample was pre-treated by heating for 3 hours in vacuum at 150° C.

Comparative Example 1

As for an adsorbent for adsorption heat pumps of Comparative Example 1, activated carbon (spherical activated carbon TAIKO Q-Type, manufactured by Futamura Chemical Co., Ltd., specific surface area: 2,000 m$^2$/g) was used.

Example 1

An adsorbent for adsorption heat pumps was obtained by dipping 0.5 g of activated carbon (spherical activated carbon TAIKO Q-Type, manufactured by Futamura Chemical Co., Ltd., specific surface area: 2,000 m$^2$/g) in 25 mL of a 2% by mass 5-sulfoisophthalic acid aqueous solution for 12 hours, and washing the activated carbon with water, followed by vacuum drying the activated carbon for 2 hours at 150° C.

Example 2

An adsorbent for adsorption heat pumps was obtained in the same manner as in Example 1, provided that the 2% by mass 5-sulfoisophthalic acid aqueous solution was replaced with a 2% by mass 1,2,4,5-benzene tetracarboxylic acid (pyromellitic acid) aqueous solution.

Example 3

An adsorbent for adsorption heat pumps was obtained in the same manner as in Example 1, provided that the 2% by mass 5-sulfoisophthalic acid aqueous solution was replaced with a 2% by mass maleic acid aqueous solution.

Example 4

An adsorbent for adsorption heat pumps was obtained in the same manner as in Example 1, provided that the 2% by mass 5-sulfoisophthalic acid aqueous solution was replaced with a 1% by mass squaric acid aqueous solution.

Comparative Example 2

As for an adsorbent for adsorption heat pumps of Comparative Example 2, activated carbon (KUREHA spherical activated carbon BAC, manufactured by KUREHA CORPORATION, specific surface area: 1,200 m$^2$/g) was used.

Example 5

An adsorbent for adsorption heat pumps was obtained by dipping 0.5 g of activated carbon (KUREHA spherical activated carbon BAC, manufactured by KUREHA CORPORATION, specific surface area: 1,200 m$^2$/g) in 25 mL of a 2% by mass maleic acid aqueous solution for 12 hours, washing the activated carbon with water, followed by vacuum drying the activated carbon for 2 hours at 150° C.

Example 6

An adsorbent for adsorption heat pumps was obtained in the same manner as in Example 5, provided that the 2% by mass maleic acid aqueous solution was replaced with a 2% by mass methanesulfonic acid aqueous solution.

Example 7

An adsorbent for adsorption heat pumps was obtained in the same manner as in Example 1, provided that the 2% by mass 5-sulfoisophthalic acid aqueous solution was replaced with a 0.4% by mass 5-sulfoisophthalic acid aqueous solution.

Example 8

An adsorbent for adsorption heat pumps was obtained in the same manner as in Example 1, provided that the 2% by mass 5-sulfoisophthalic acid aqueous solution was replaced with a 4% by mass 5-sulfoisophthalic acid aqueous solution.

Comparative Example 3

An adsorbent for adsorption heat pumps was obtained by dipping 0.5 g of activated carbon (spherical activated carbon TAIKO Q-Type, manufactured by Futamura Chemical Co., Ltd., specific surface area: 2,000 m²/g) in 50 mL of a 15% by mass hydrogen peroxide aqueous solution for 5 hours, followed by vacuum drying the activated carbon.

Comparative Example 4

An adsorbent for adsorption heat pumps was obtained in the same manner as in Comparative Example 3, provided that the activated carbon was replaced with activated carbon (KUREHA spherical activated carbon BAC, manufactured by KUREHA CORPORATION, specific surface area: 1,200 m²/g).

<Water Vapor Adsorption Isotherm>

A water vapor adsorption isotherm of each of the obtained adsorbents for adsorption heat pumps was determined. The results are presented in FIGS. 2 to 8.

In order to evaluate thermal resistance of the adsorbents for adsorption heat pumps of Example 1 and Comparative Example 3, moreover, the adsorbents were subjected to a heat treatment for 0.5 hours at 300° C. A water vapor adsorption isotherm of each of the adsorbents for adsorption heat pumps after the heat treatment was determined. The results are presented in FIG. 8.

It was confirmed from the comparison between Comparative Example 1 and Examples 1 to 4 (FIGS. 2 and 3), and the comparison between Comparative Example 2 and Examples 5 to 6 (FIG. 4) that the disclosed adsorbent for adsorption heat pumps caused an adsorption and desorption reaction at the lower relative vapor pressure compared to the untreated activated carbon.

Figure 5:
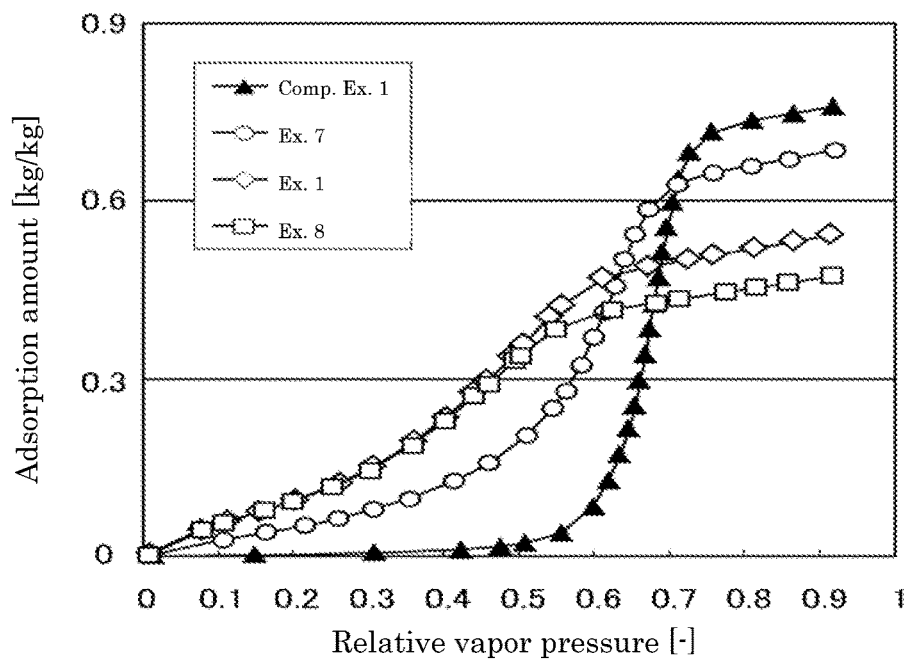
FIG. 5 is water vapor adsorption isotherms of the adsorbents for adsorption heat pumps of Example 1, Example 7, Example 8, and Comparative Example 1.

The effect of enhancing hydrophilic properties was confirmed, when a concentration of the aqueous solution containing the organic molecules, in which the activated carbon was dipped, was changed and a weak aqueous solution, where the concentration of the organic molecules was 0.4% by mass, was used (Example 7, FIG. 5). When the concentration of the organic molecules was 2% by mass, and 4% by mass, no change was observed in the adsorption ability at the relative vapor pressure of 0 to 0.5 (Example 1, Example 8, FIG. 5). It was confirmed from the results as mentioned that an effect of hydrophilization could be stably exhibited by setting the concentration of the solution, in which the activated carbon was dipped, to the certain concentration or higher.

Figure 6:
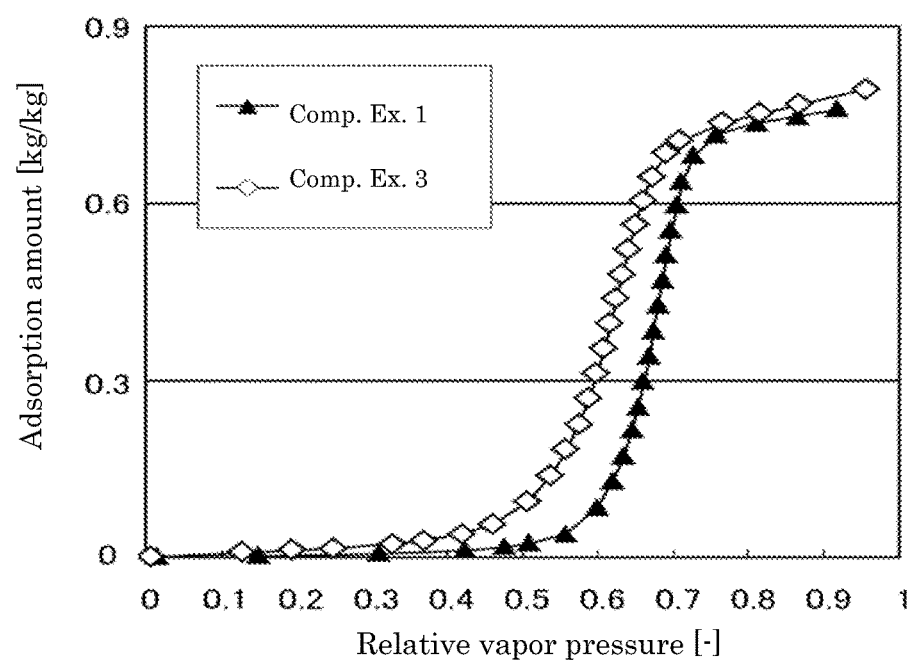
FIG. 6 is water vapor adsorption isotherms of the adsorbents for adsorption heat pumps of Comparative Example 1, and Comparative Example 3.
Figure 7:
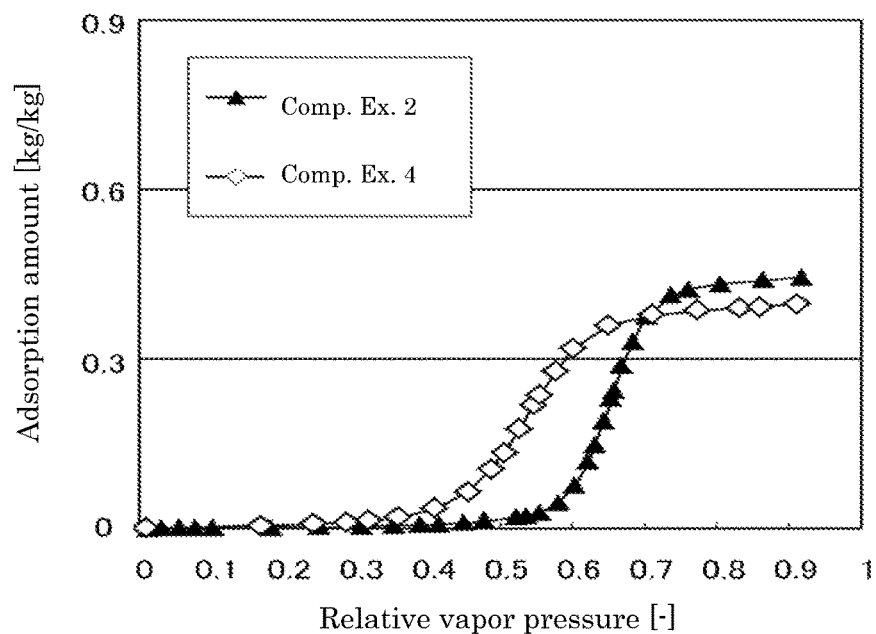
FIG. 7 is water vapor adsorption isotherms of the adsorbents for adsorption heat pumps of Comparative Example 2, and Comparative Example 4.

The activated carbon subjected to the hydrophilic treatment using hydrogen peroxide obtained the water vapor adsorption isotherm similar to those of Examples (Comparative Example 3, Comparative Example 4, FIG. 6, FIG. 7).

Figure 8:
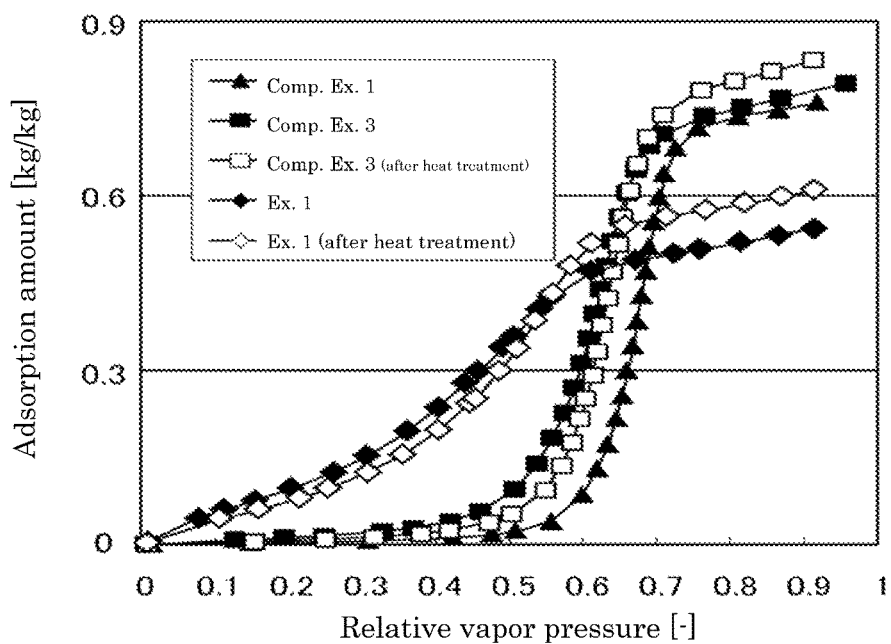
FIG. 8 is water vapor adsorption isotherms of the adsorbents for adsorption heat pumps of Example 1, Example 1 after a heat treatment, Comparative Example 1, Comparative Example 3, and Comparative Example 3 after a heat treatment.

After the heat treatment, however, the water vapor adsorption isotherm of the activated carbon subjected to the hydrophilic treatment using hydrogen peroxide became close to the water vapor adsorption isotherm of the untreated activated carbon (FIG. 8). The reason thereof is considered that hydrophilic functional groups directly added to a surface of the activated carbon by the hydrophilic treatment using hydrogen peroxide are lost at high temperature.

On the other hand, the adsorbent for adsorption heat pumps of Example 1 had hardly any change in the water vapor adsorption isotherm thereof even after the heat treatment, and the excellent water vapor adsorption isotherm was obtained (FIG. 8).

<GC-MS>

Gas chromatography mass spectrometry (GC-MS) was performed to confirm whether or not the organic molecules were present inside pores of the activated carbon of the adsorbent for adsorption heat pumps obtained each of the examples. The results are presented in FIGS. 9 to 12.

Figure 9:
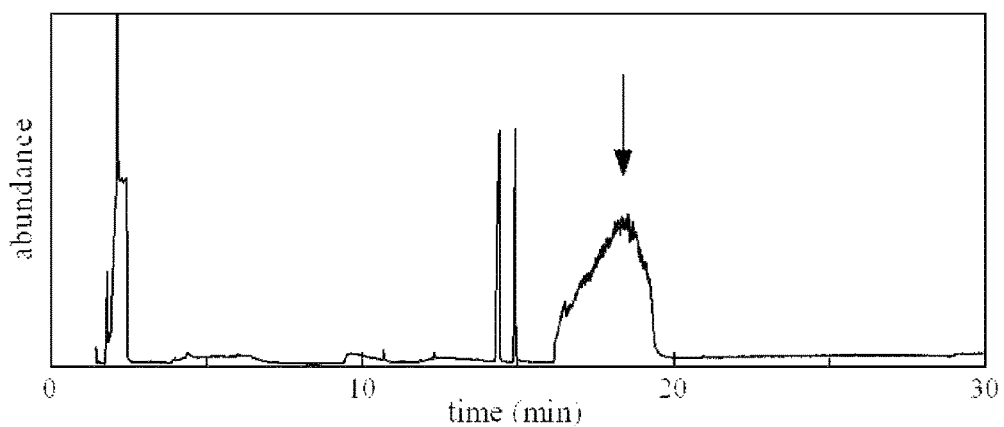
FIG. 9 is the result of gas chromatography mass spectrometry (GC-MS) of the adsorbent for adsorption heat pumps of Example 2.

FIG. 9 is the GC-MS result of the adsorbent for adsorption heat pumps of Example 2.

Figure 10:
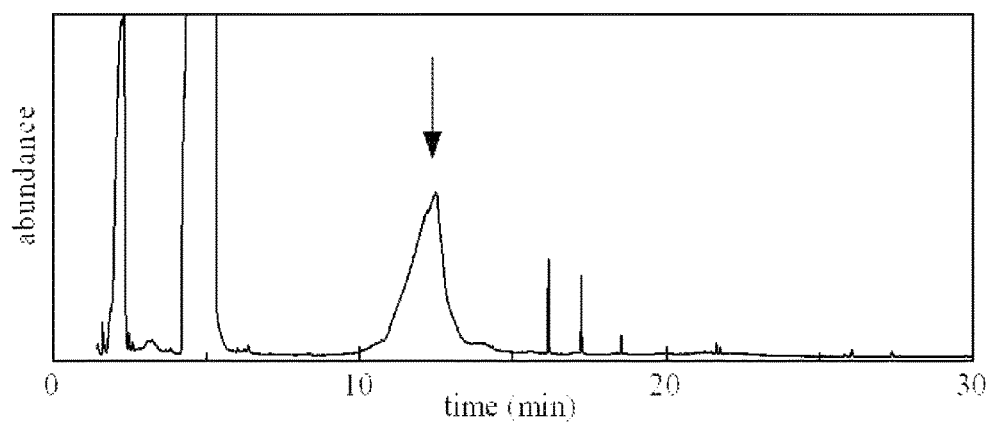
FIG. 10 is the result of GC-MS of the adsorbent for adsorption heat pumps of Example 3.

FIG. 10 is the GC-MS result of the adsorbent for adsorption heat pumps of Example 3.

Figure 11:
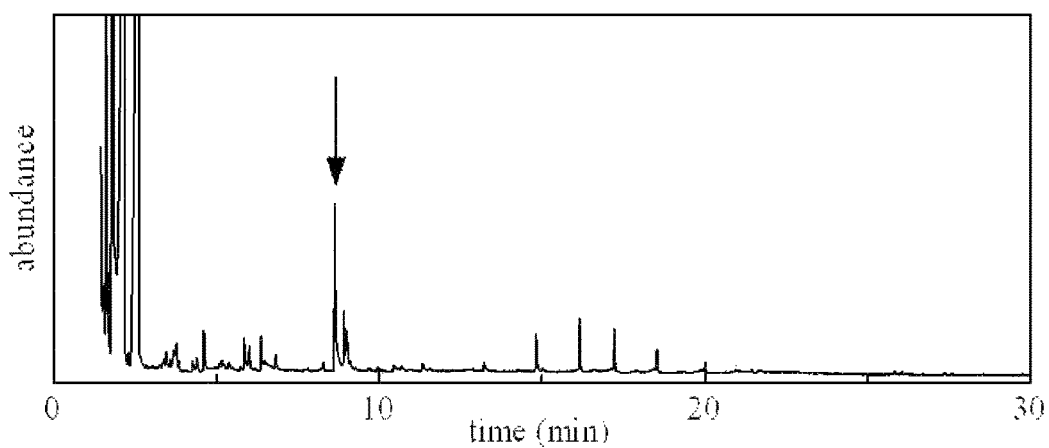
FIG. 11 is the result of GC-MS of the adsorbent for adsorption heat pumps of Example 4.

FIG. 11 is the GC-MS result of the adsorbent for adsorption heat pumps of Example 4.

Figure 12:
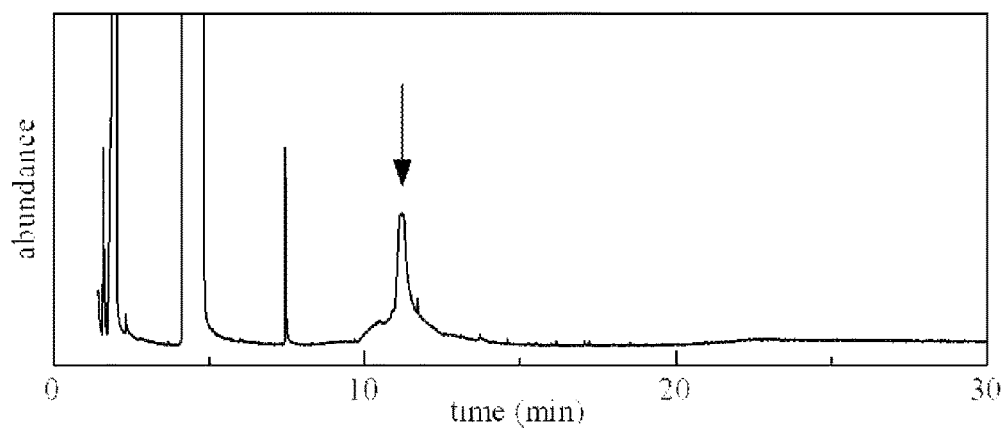
FIG. 12 is the result of GC-MS of the adsorbent for adsorption heat pumps of Example 5.

FIG. 12 is the GC-MS result of the adsorbent for adsorption heat pumps of Example 5.

The peak derived from the organic molecules was confirmed at the position indicated with an arrow in each of FIGS. 9 to 12.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. An adsorbent for adsorption heat pumps, the adsorbent comprising:
   activated carbon; and
   organic molecules each containing at least one hydrophilic functional group, where the organic molecules are provided in pores of the activated carbon,
   wherein the organic molecule is at least one selected from the group consisting of squaric acid, sulfoisophthalic acid, and benzene tetracarboxylic acid.

2. The adsorbent according to claim 1, wherein a specific surface area of the activated carbon is 1,000 m²/g to 2,500 m²/g.

3. An adsorption heat pump, comprising:
   an adsorbent for adsorption heat pumps;
   an evaporator configured to evaporate a liquid adsorbate to turn the liquid adsorbate into a gas adsorbate;
   a condenser, which is connected to the evaporator, and is configured to condense the gas adsorbate to turn the gas adsorbate into the liquid adsorbate; and
   two adsorbers, which are connected to the evaporator and the condenser, and each contain the adsorbent capable of adsorbing and desorbing the adsorbate;
   wherein the adsorbent contains:
      activated carbon; and
      organic molecules each containing at least one hydrophilic functional group, where the organic molecules are provided in pores of the activated carbon,
      wherein the organic molecule is at least one selected from the group consisting of squaric acid, sulfoisophthalic acid, and benzene tetracarboxylic acid.

* * * * *